(12) United States Patent
Hoffman et al.

(10) Patent No.: US 8,860,234 B2
(45) Date of Patent: Oct. 14, 2014

(54) SYSTEMS AND METHODS FOR HARVESTING VIBRATIONAL ENERGY FROM VEHICLES

(75) Inventors: Herbert Hoffman, Seattle, WA (US); Eric Hofbeck, Lynnwood, WA (US); Alex Lin, Renton, WA (US)

(73) Assignee: The Boeing Company, Chicago, IL (US)

( * ) Notice: Subject to any disclaimer, the term of this patent is extended or adjusted under 35 U.S.C. 154(b) by 868 days.

(21) Appl. No.: 12/983,749

(22) Filed: Jan. 3, 2011

(65) Prior Publication Data

US 2012/0169064 A1 Jul. 5, 2012

(51) Int. Cl.
*F02B 63/04* (2006.01)
*F03B 13/10* (2006.01)

(52) U.S. Cl.
USPC .................................... 290/1 R; 290/54

(58) Field of Classification Search
CPC ................................. H02N 2/188; F03G 7/08
USPC ........ 290/1 R, 54; 310/339, 25, 29, 36, 12.12
See application file for complete search history.

(56) References Cited

U.S. PATENT DOCUMENTS

| | | | | |
|---|---|---|---|---|
| 3,239,678 | A * | 3/1966 | Kolm et al. | 307/43 |
| 4,387,318 | A * | 6/1983 | Kolm et al. | 310/330 |
| 4,467,236 | A * | 8/1984 | Kolm et al. | 310/321 |
| 6,563,250 | B2 | 5/2003 | Mathur | |
| 7,878,453 | B2 * | 2/2011 | Liggett | 244/126 |
| 8,232,706 | B2 * | 7/2012 | Shmilovich et al. | 310/339 |
| 8,519,554 | B2 * | 8/2013 | Kaplan | 290/1 R |
| 2007/0114890 | A1 * | 5/2007 | Churchill et al. | 310/339 |
| 2009/0167110 | A1 * | 7/2009 | Berkcan et al. | 310/323.01 |
| 2009/0230924 | A1 | 9/2009 | Wright | |
| 2010/0072759 | A1 | 3/2010 | Andosca | |
| 2010/0141096 | A1 | 6/2010 | Churchill et al. | |
| 2010/0148519 | A1 | 6/2010 | Shih | |
| 2010/0187835 | A1 * | 7/2010 | Hohlfeld et al. | 290/1 R |

FOREIGN PATENT DOCUMENTS

EP 1843405 10/2007

OTHER PUBLICATIONS

Featherston C A et al: "Harvesting vibration energy for structural health monitoring in aircraft", Key Engineering Materials, vol. 413-414, 2009, pp. 439-446.
Cornwell P J et al: "Enhancing power harvesting using a tuned auxiliary structure", Journal of Intelligent Material Systems and Structures, vol. 16, No. 10, Oct. 2005, pp. 825-834.
International Search Report and Written Opinion in International Application No. PCT/US2011/053074 to The Boeing Company.

(Continued)

*Primary Examiner* — Julio Gonzalez
(74) *Attorney, Agent, or Firm* — Ostrager Chong Flaherty & Broitman P.C.

(57) ABSTRACT

Disclosed are methods, systems and apparatuses for harvesting vibrational energy from vehicles, as well as methods for locating vibrational energy on a vehicle. One harvesting apparatus comprises a vibrational energy harvester coupled to a substantially maximal vibrational displacement node of the structural element of a vehicle, and tuned to a frequency of vibration of the maximal vibrational displacement node. The harvester may be one of a variety of harvesting devices, such as piezoelectric devices. Methods are also provided to locate structural elements which are appropriate for vibrational energy harvesting.

14 Claims, 18 Drawing Sheets

(56) References Cited

OTHER PUBLICATIONS

Challa, Vinod, Prasad, M.G., Shi, Yong, Fisher, Frank, "Piezoelectric-Based Vibration Energy Harvesting", Department of Mechanical Engineering, Stevens Institute of Technology, Hoboken, NJ, available at http://www.stevens.edu/provost/fileadmin/provost/pdf/38_Piezoelectric-Based_Vibration_Energy_Harvesting.pdf, retrieved on Nov. 11, 2010.

Sayer, Robert, "Finite Element Analysis—A Numerical Tool for Machinery Vibration Analysis", Sayer & Associates, Inc., Medina, Ohio, Sound & Vibration Magazine, May 2004.

Beeby, S. P. et al, "Macro and Micro Scale Electromagnetic Kinetic Energy Harvesting Generators", Symposium on Design, Test, Integration and Packaging of MEMS and MOEMS 2006, Stresa, Lago Maggiore, Italy.

de Quieroz, A.C.M., "Electrostatic vibrational energy harvesting using a variation of Bennet's doubler", 2010 53rd IEEE International Midwest Symposium on Circuits and Systems (MWSCAS), Seattle, WA.

Wang, K.D., et al., "Noise and Vibration Analysis by Finite Elements", available at http://www.google.com/url?sa=t&source=web& cd=1 &ved=0CB0QFjAA&url=http%3A%2F%2Fwww.ansys.com%2Fevents%2Fproceedings%2F2002%2FPAPERS%2F8.pdf&ei=ly4iTZq3CsP6lwe774jIDA&usg=AFQjCNEWpiDtk3Fwbf5rgq6_fL1i8kAAqQ&sig2=OUsigUmAQBRMqvwo666m8g, retrieved on Nov. 12, 2010.

Doyle, James, "Modern Experimental Stress Analysis: completing the solution of partially specified problems", Chapter 1: Finite Element Methods, 2004 John Wiley & Sons, Ltd.

Roylance, David, "Finite Element Analysis", Massachusetts Institute of Technology, Department of Materials Science and Engineering, Feb. 28, 2001.

Lomax, Harvard, et al, "Fundamentals of Computational Fluid Dynamics", Aug. 26, 1999.

Yildiz, Faruk, "Potential Ambient-Energy Harvesting Sources and Techniques", The Journal of Technology Studies, Fall 2009, vol. 35, No. 1.

Shen, Donga, "Piezoelectric Energy Harvesting Devices for Low Frequency Vibration Applications", PhD Dissertation at Auburn University, May 9, 2009.

Sodano, Henry, et al., "Comparison of Piezoelectric Energy Harvesting Devices for Recharging Batteries", Journal of Intelligent Material Systems and Structures, vol. 16, Oct. 2005.

O'Neil, Bob, et al., "First Draft of Standard on Vibration Energy Harvesting", Compiled by committee formed at the 2nd Annual Energy Harvesting Workshop held on Jan. 30-31, 2007 at Fort Worth, TX.

Elfrink, R., et al., "Vibration Energy Harvesting With Aluminum Nitride-Based Piezoelectric Devices", Proceedings of PowerMEMS 2008+ microEMS2008, Sendai, Japan, Nov. 9-12, 2008, pp. 249-252.

Townley, Andrew, "Vibrational Energy Harvesting Using MEMS Piezoelectric Generators", Electrical Engineering, University of Pennsylvania, Advisor: Gianluca Piazza.

Noel Eduard du Toit, "Modeling and Design of a MEMS Piezoelectric Vibration Energy Harvester", Submitted to the Department of Aeronautics and Astronautics in partial fulfillment of the requirements for the degree of Master of Science in Aeronautics and Astronautics at the Massachusetts Institute of Technology, May 2005.

Fluent, Inc., "What is Computational Fluid Dynamics", available at http://www.fluent.com/solutions/whatcfd.htm, retrieved on Nov. 18, 2010.

Sarradj, Ennes, "Energy-based vibroacoustics: SEA and beyond", CFA/DAGA 2004.

* cited by examiner

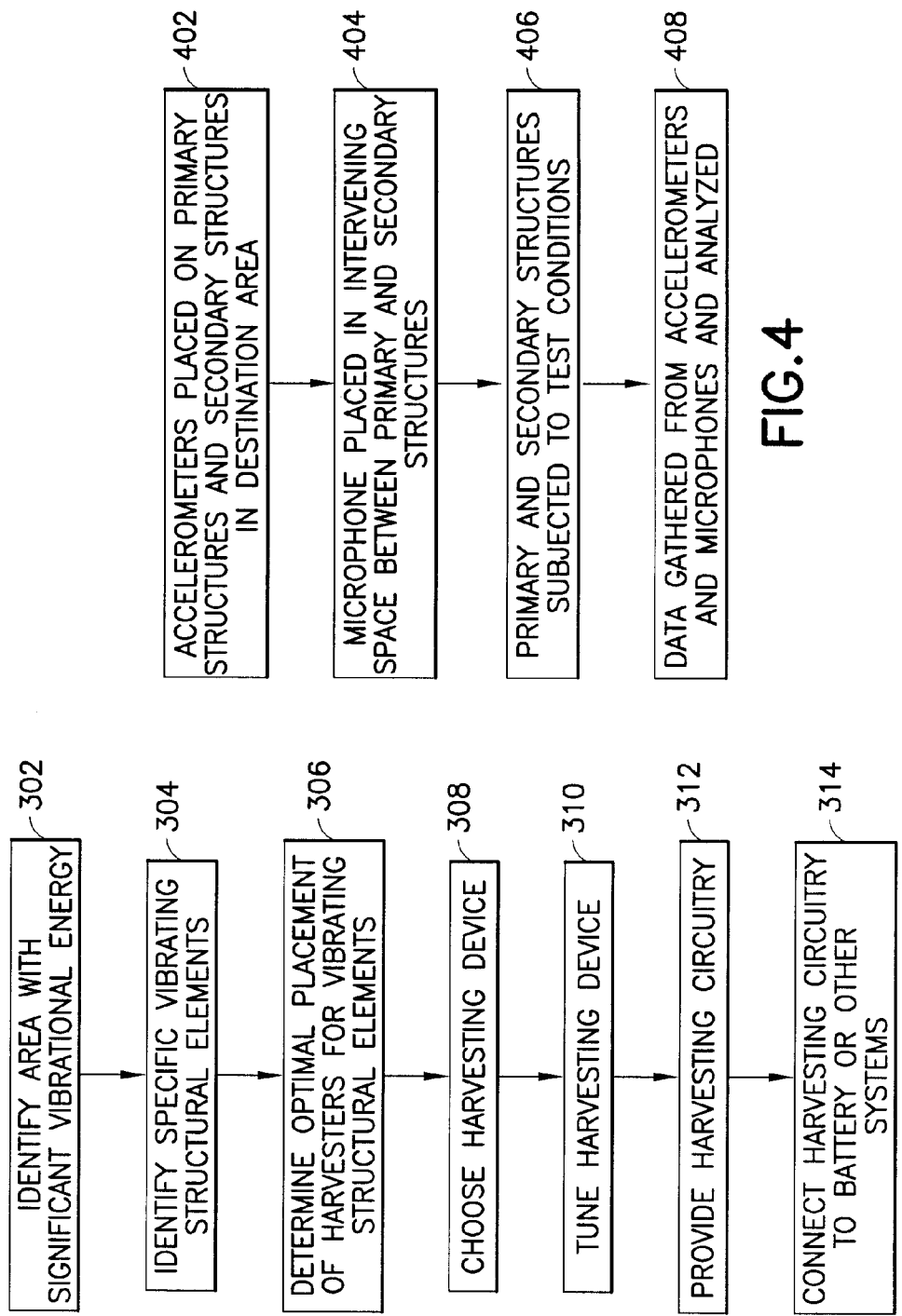

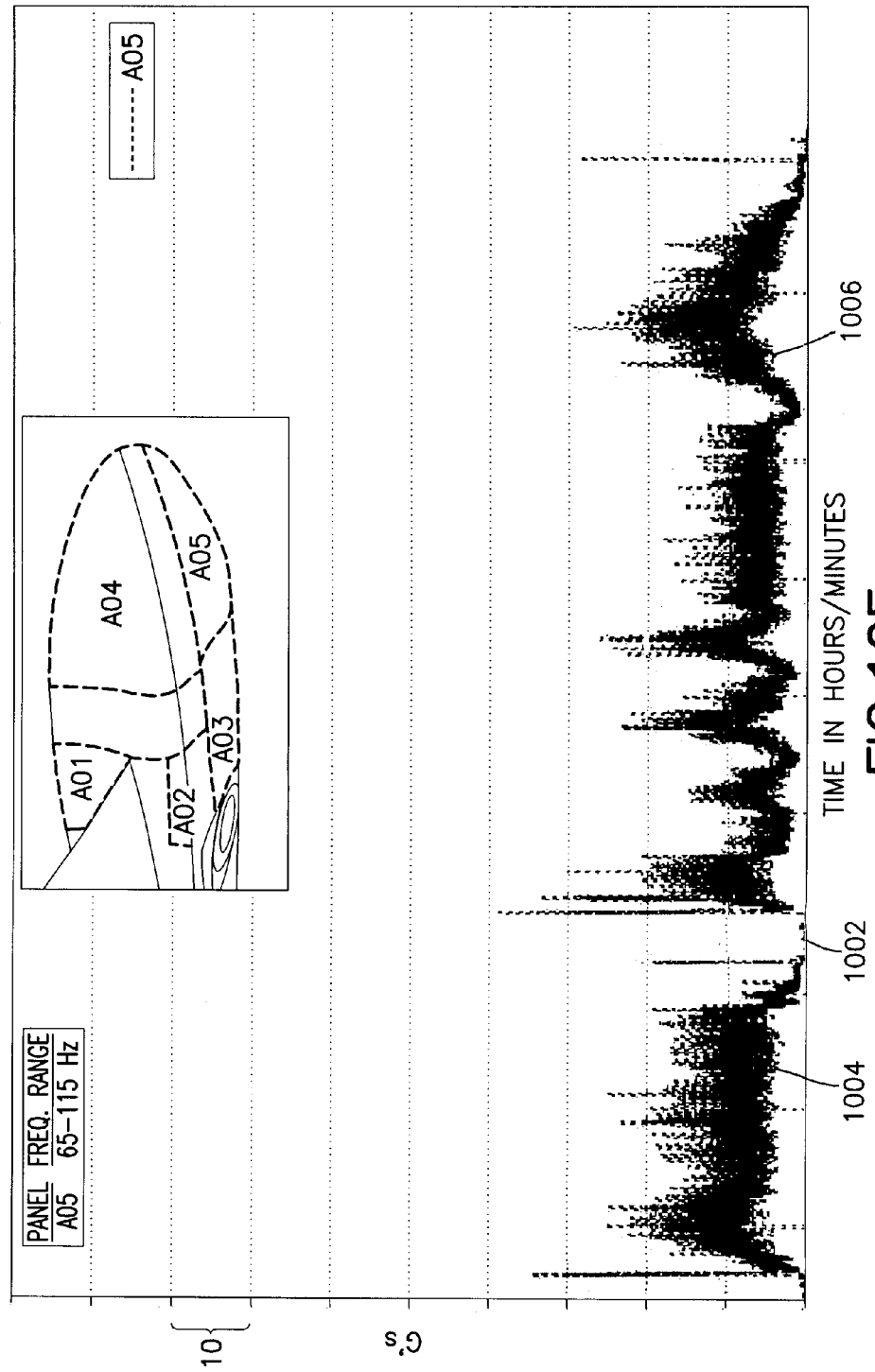

SYSTEMS AND METHODS FOR HARVESTING VIBRATIONAL ENERGY FROM VEHICLES

FIELD

This disclosure generally relates to harvesting vibrational energy from structural elements in a vehicle, and more specifically, to determining placement and configuration of vibrational energy harvesting devices on structural elements within a vehicle such as an aircraft.

BACKGROUND

Fuel efficiency is a major consideration for vehicles such as aircraft. While engine design, vehicle body design, materials selection, and other aspects are chosen with fuel efficiency in mind, other techniques, mechanisms and energy sources that will improve fuel efficiency are continually being sought.

In an aircraft, high vehicle speed, intense mechanical disruption caused by engines or other machinery, and other effects and structures generate large amounts of vibrational energy throughout various structural elements within the aircraft. Many systems or devices have been developed to attempt to reduce vibration and noise induced in various parts of a vehicle. Systems attempt to reduce vibration through various means (for example, by use of certain materials, or through mechanical means).

SUMMARY

It would be beneficial to recapture at least some vibrational energy present in vehicles and convert it to electrical energy for use in onboard systems. Accordingly, systems and methods are provided for harvesting vibrational energy from various structural elements within/on a vehicle.

Embodiments contemplated by this disclosure generally comprise the coupling of individual vibrational energy harvesting devices, or clusters of such devices, to suitable vibrating structural elements of a vehicle. The teachings of this disclosure may be applied to various different types of vehicles, such as, without limitation, aircraft, spacecraft or ground vehicles.

Example areas containing suitable vibrating structural elements will be described in further detail below, but generally include fairing panels, which smooth out airflow over a particular region, and regions impinged upon by strong aerodynamic currents, such as the area of an aircraft rear of the wings which is impinged upon by shock cell noise.

Energy may be harvested from "primary" structures—where vibration is generated by effects directly or closely impinging on those structures. For example, fairing panels may vibrate due to being surrounded by a turbulent boundary layer. Energy may also be harvested from "secondary" structures, which are located downstream from, and receive energy from, such primary structures. For example, frames that support fairing panels, which may consist of cage-like structures, may be mechanically coupled to fairing panels, and thus may receive a substantial portion of the vibrational energy that flows from the fairing panels. Embodiments of this disclosure contemplate harvesting energy from such secondary structures, and also contemplate methods of identification of such secondary structures.

Benefit can be gained by carefully choosing placement locations for the harvesting devices. Analytical methods, such as finite element analysis, may be used to determine specific vibrational characteristics of structures. Such characteristics can include normal modes of vibration, locations of maximal vibrational displacement, and vibrational frequencies of the normal modes of vibration. Other analytical methods may also be used to determine vibrational characteristics.

Additional benefit may be gained by tuning the harvesting devices to one or more frequencies dictated by the vibrational characteristics of the structural elements. In one aspect, it may be beneficial to tune harvesting devices to one or more resonant frequency of structural elements to which they are attached, to assist in maximizing energy harvested.

In yet another aspect, it may be of further benefit may to provide harvesting circuitry for conversion of the electric signals generated by the harvesting devices into a form more appropriate for use with onboard/internal systems. Such circuitry generally comprises signal processing circuitry for converting high voltage AC output to lower voltage DC output, and can include circuitry for storing or making use of the energy harvested.

In the exemplary embodiments provided in this disclosure, use of the above-described methods and systems are described in the context of an aircraft. More specifically, in the attached embodiments, wing-to-body fairing panels and surrounding structures on an aircraft supply harvestable displacement and/or vibrational energy. The area around wing-to-body fairing panels experiences a very high level of vibration throughout virtually all phases of flight. In one embodiment, energy is drawn out of these panels that may supplement, reduce, or replace power for onboard aircraft systems, such as lights, coffee makers, galley ovens and other onboard appliances throughout an entire flight.

In one embodiment, a system is disclosed for harvesting vibrational energy from a structural element of a vehicle possessing vibrational energy. The system comprises a vibrational energy harvester coupled to a location on the structural element, and tuned to one or more frequencies of vibration of the structural element. Preferably, the vibrational energy harvester is located at or near a maximal vibrational displacement node of the structural element.

In another embodiment, a method is disclosed of harvesting vibrational energy from a vehicle. The method comprises identifying a structural element suitable for vibrational energy harvesting, identifying a location of said structural element, tuning a harvesting device to a frequency of vibration of the structural element, and coupling said harvesting devices to said location of said structural element. Preferably, said location is a maximal vibrational displacement node of said structural element.

In yet another embodiment, a system for harvesting vibrational energy on an aircraft is disclosed. The system comprises wing-to-body fairing panels located in an area adjacent to and generally surrounding a wing to fuselage joint area, piezoelectric devices placed on said wing-to-body fairing panels, approximately at maximal vibrational displacement nodes of said panels, said maximal vibrational displacement nodes being determined by constructing a computer model; obtaining data gained from in-flight testing, and providing said computer model and flight test data to a finite element analysis program.

In yet another embodiment, a method is disclosed for harvesting vibrational energy from wing-to-body fairing panels. The method comprises identifying maximal vibrational displacement nodes of the wing-to-body fairing panels during flight of an aircraft utilizing the wing-to-body fairing panels, tuning said vibrational energy harvesting devices to one or more resonant frequencies of wing-to-body fairing panels, and coupling piezoelectric devices to said maximal vibrational displacement nodes of the wing-to-body fairing panels.

The features, functions, and advantages that have been discussed can be achieved independently in various embodiments disclosed herein, or may be combined in yet other embodiments, further details of which can be seen with reference to the following description and drawings. Other features and advantages of the embodiments disclosed herein will be explained in the following detailed description with reference to the drawings.

BRIEF DESCRIPTION OF THE DRAWINGS

FIG. 3 is an illustration of steps of a method for harvesting vibrational energy from a vehicle.

FIG. 4 is an illustration of steps of a method for determining "secondary" structures from which to harvest energy.

FIG. 9 is an illustration of a wing-to-body fairing region of an aircraft, including several wing-to-body fairing panels suitable for harvesting energy from.

FIGS. 10A-10E are graphs showing vibrational acceleration vs. time for the wing-to-body panels depicted in FIG. 9.

Reference will hereinafter be made to the drawings in which similar elements in different drawings bear the same reference numerals.

DETAILED DESCRIPTION

The following disclosure describes systems and methods for harvesting vibrational energy from structural elements on various types of vehicles. Examples are provided which utilize the systems and methods disclosed herein to harvest vibrational energy from aircraft, or more specifically, from the wing-to-body fairing panels of an aircraft. While the disclosure provided below explains these systems and methods in the context of an aircraft, it should be understood that these systems and methods may be applicable to an array of vehicles, include ground or space vehicles, as well as other appropriate non-vehicle structures, and should not be construed to be limited to application on an aircraft.

Certain specific details are set forth in the following description and in FIGS. 1-14, to provide a thorough understanding of various embodiments. Well-known structures, systems, and methods have not been shown or described in detail below to avoid unnecessarily obscuring the description of the various embodiments. In addition, those of ordinary skill in the relevant art will understand that additional embodiments may be practiced without several of the details described below.

Figure 1:
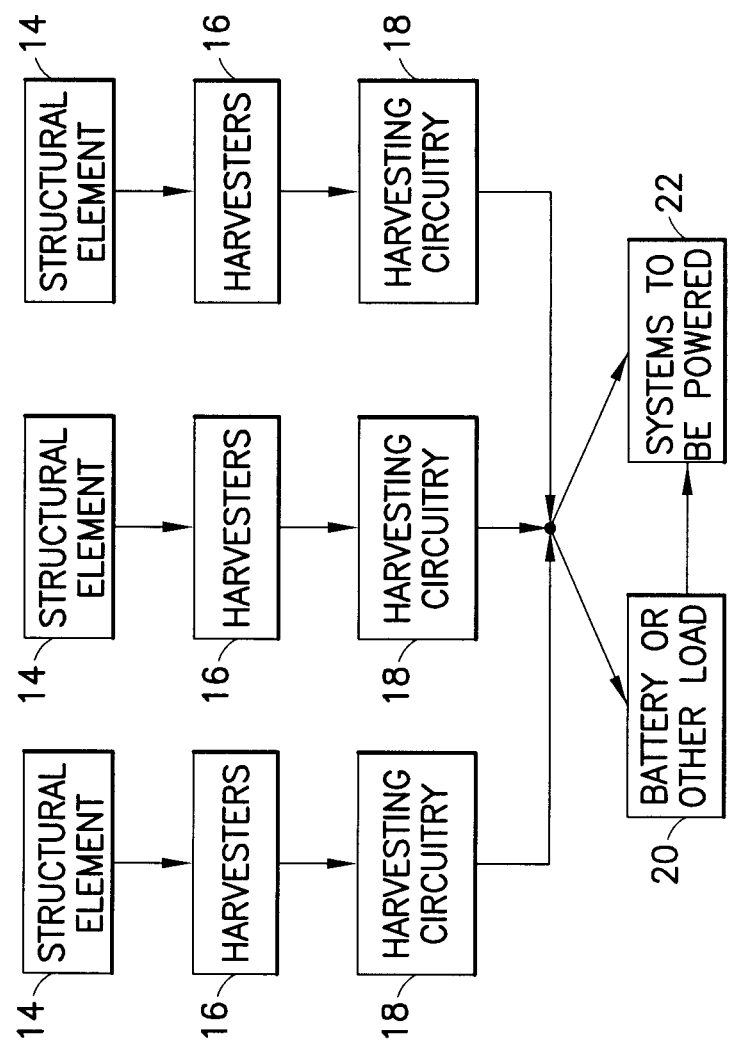
FIG. 1 is a block diagram depicting a system for harvesting energy from vibrating structures on a vehicle.

Referring now to FIG. 1, a block diagram of an exemplary system 12 for harvesting vibrational energy from vibrating structural elements of a vehicle is depicted. The system 12 generally comprises vibrating structural elements 14 of a vehicle which may vibrate at a particular frequency. Harvesters (also referred to herein as "harvesting devices") 16 are coupled to the structural elements 14 and produce raw electrical signals responsive to vibration of the structural elements 14. Harvesting circuitry 18 is coupled to harvesters 16, and converts the raw electric signals from the harvesters 16 to a form more useful for driving a load 20, which is coupled to the harvesting circuitry 18. Vehicle systems 22 may be coupled to and provided with power by battery 20. Some vehicle systems 22 may be coupled to the harvesting circuitry 18, without an intervening battery 20.

Figure 2:
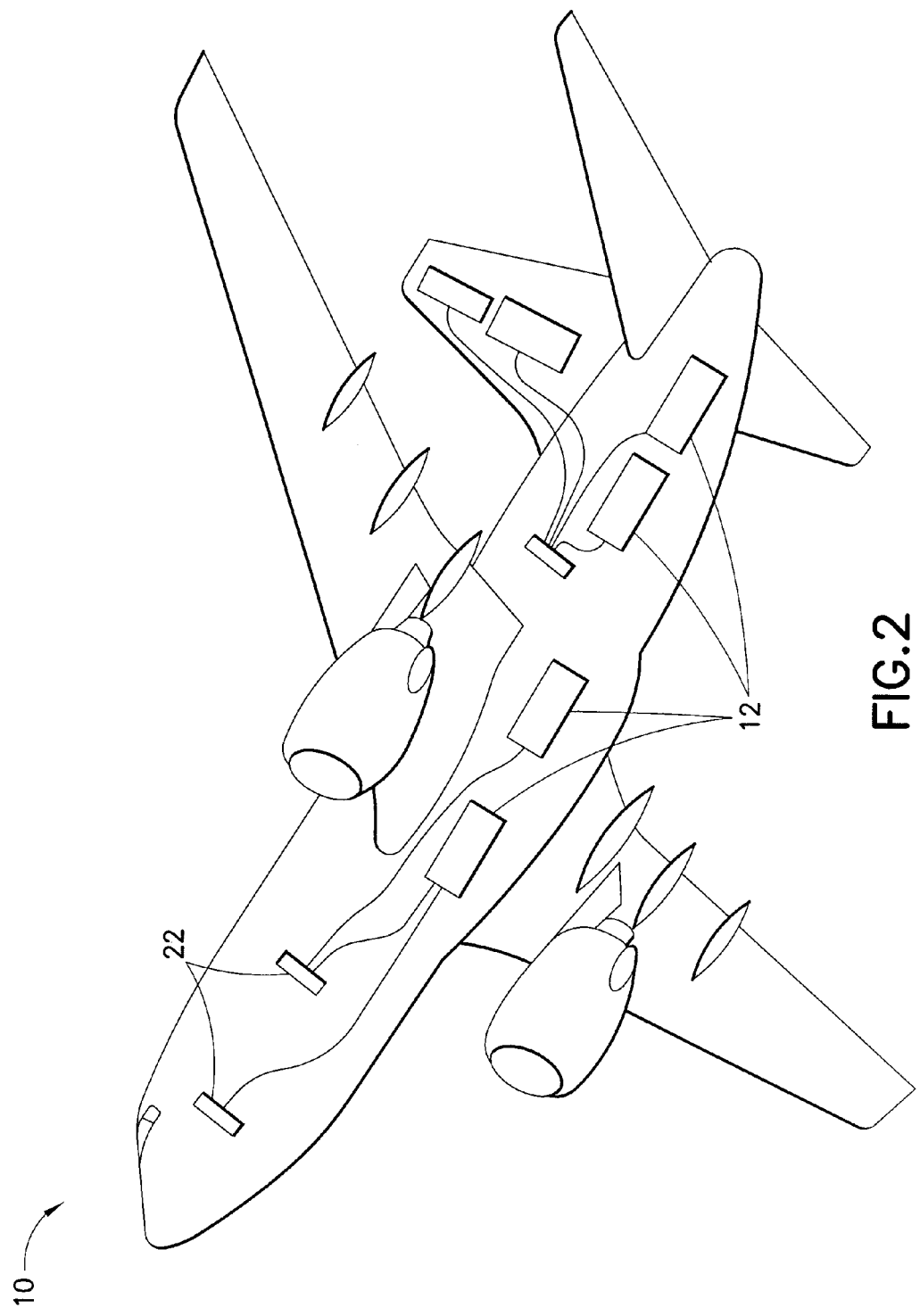
FIG. 2 is an illustration of an example of one or more apparatuses on a vehicle utilizing systems for harvesting vibrational energy.

Referring now to FIG. 2, an illustration of an aircraft having one or more apparatuses utilizing vibrational energy harvesting systems 12 at different locations is shown. The energy harvesting systems 12 can convert vibrational energy present in various structural elements of an aircraft 10 to electrical energy for use in apparatuses 22 onboard the aircraft.

Referring now to FIG. 3, a method of installing vibrational energy harvesting systems will now be described. The systems and methods contemplate coupling vibrational energy harvesting devices to specific structural elements of a vehicle, and harvesting vibrational energy from the locations to which the harvesting devices are coupled. The harvesting devices are preferably attached to locations on the structural elements which produce maximal vibrational energy.

In step 302, an area of a vehicle for harvesting vibrational energy is identified. Some such areas have "primary" structural elements, where vibration is generated by effects directly or closely impinging on those structural elements. Areas containing "primary" structural elements will be referred to herein as "primary" areas. Other areas have "secondary" structural elements, which receive vibrational energy from "primary" structural elements. Such areas will be referred to herein as "secondary" areas.

Areas having "primary" structural elements may include fairing panels, such as wing-to-body fairing panels on an aircraft, areas on the fuselage of an aircraft rear of the wing, upon which shock cell noise directly impinges, and other areas of a vehicle which experience intense or turbulent airflow. Other areas appropriate for harvesting vibrational energy may include, without limitation, areas proximate to machinery such as an engine.

Two mechanisms which generate high vibrational energy in an area include turbulent airflow at a particular location, caused by the shape or positioning of vehicle features, and impingement by generated airflow on a specific location of a vehicle, by a machine such as an engine. Turbulent airflow may include areas which experience a turbulent boundary layer. Areas impinged by generated airflow may include specific locations on a vehicle on which airflow from an engine impacts the vehicle body. For example, in an aircraft, shock cell noise from an engine may impinge directly on a location on the aircraft fuselage and generate significant vibrational energy.

Some areas of intense or turbulent airflow may be determined using computational fluid dynamics, which in general is a system of mathematically determining fluid flow around a body. Test data from vehicle operation can be utilized to verify the educated guesses provided by the results of computational fluid dynamics or by other methods of analysis. Additional information about computational fluid dynamics can be found in the following document: "Fundamentals of Computational Fluid Dynamics," Lomax, Harvard, et al., NASA Ames Research Center, Zingg, David, University of Toronto Institute for Aerospace Studies, Aug. 26, 1999. This document is incorporated herein by reference into this specification.

"Secondary" areas with substantial vibrational energy can be identified by tracing paths of vibrational energy flow from "primary" structural elements in areas known to have vibrating structural elements. This can be done in many ways. For example, Statistical Energy Analysis ("SEA") is a set of methodologies for determining vibrational energy transfer between distinct "subsystems," and may be used to trace paths of vibrational energy flow. In the context of this specification, SEA is preferably used to determine whether there is vibrational energy transfer away from a known source of vibrational energy to other locations coupled to the known source. Vibrational energy is the energy present in structural elements due to vibration of those structural elements. Accuracy of SEA is dependent on many factors, including providing accurate models of the physical systems, subsystems, and structures being analyzed. SEA can also be used to verify areas suspected of receiving substantial energy, which can be further verified with additional analysis or testing. More information about Statistical Energy Analysis can be found in the following document: Sarradj, Ennes, "Energy-based vibroacoustics: SEA and beyond," Gesellschaft fur Akustikforschung Dresden mbH, D-01099 Dresden, Germany, which is incorporated herein by reference.

Additional information regarding identification of "secondary" areas will be discussed below, with respect to FIG. 4.

In step 304, specific vibrating structural elements are identified. Such elements can include vehicle skin panels, stringers, frame elements, other beam-like or membrane-like elements, or any other element from which vibrational energy can be harvested. These elements can include membrane or beam-like elements, whose normal modes of vibration can be analyzed.

In step 306, specific structural elements determined to possess substantial amounts of vibrational energy are analyzed to determine optimal placement of vibrational energy harvesting devices. Optimal placement locations include maximal vibrational displacement nodes, which are locations on the structural elements which vibrate at the highest amplitude.

Different structures have various modes of vibration, each of which may be activated differently depending on physical excitation of the structures. Vehicle operation data such as test flight data for an aircraft, or other operational data for other types of vehicles, as well as other types of data may therefore be used to determine what forces are applied to the different structural elements of a vehicle to physically excite them. Instruments, such as accelerometers or microphones (such as high intensity microphones from Kulite Semiconductor Products, Inc. of Leonia, N.J.) can be used to gather data about physical excitations that are experienced at different locations on a vehicle.

For optimal energy harvesting, harvesters are preferably located at maximal vibrational displacement nodes of the structural element to which they are attached. The term "maximal vibrational displacement node" refers to a location of a structural element that experiences maximal flexure. Harvesters need not be located exactly at this location—energy may be captured at locations near the exact points of maximal flexure. It is also possible to locate harvesters at any location on the structural element. This may be desirable if, for example, harvesters are already located at the nodes of maximal vibrational displacement of the structural element, and it is desirable to harvest additional energy from that structural element through the use of additional harvesters.

One way to determine optimal placement of harvesters is with the assistance of finite element analysis. Finite element analysis ("FEM analysis") is a set of methodologies usually implemented as a computerized process in which a computer model of a physical structure is analyzed to determine evolution of that model over time. Finite Element Analysis may be used to determine vibrational characteristics of a coupled system of structural elements based on a given set of excitation forces.

Finite element analysis requires a finite element model of the structure that is going to be analyzed, along with inputs which describe how the elements of the model are excited. The computerized process can produce a visualization of the evolution of the physical system over time, and can provide data such as deformation and vibrational characteristics of various elements. The visualization and/or data provided can assist in determining vibrational characteristics of the subject structures, in order to determine optimal placement. Other characteristics determined by the finite analysis method can include a listing of various natural modes of vibration, identification of one or more modes of vibration which exhibit maximal vibrational displacement, and determining the frequency of vibration of various modes of vibration of each structure. It should be noted that results from FEM analysis are dependent on quality of the model and input data provided. Additional information regarding Finite Element Analysis can be found in the following documents: Roylance, David, "Finite Element Analysis," Department of Materials Science and Engineering, Massachusetts Institute of Technology, Feb. 28, 2001; Doyle, James, "Modern Experimental Stress Analysis: completing the solution of partially specified problems.", 2004, Chapter 1: "Finite Element Methods", both of which are incorporated herein by reference.

A process utilizing finite element analysis to determine optimal harvester placement will be described below, with respect to FIG. 5.

In step 308, after determining the vibrational characteristics of the structural element from which vibrational energy is to be harvested, a harvesting device type should be properly chosen. Known devices which convert vibrational energy into electric energy generally utilize one of three methods of energy conversion: electromagnetic conversion, electrostatic conversion, and piezoelectric conversion. Different vibrational energy harvesting devices which utilize these mechanisms are possible, such as piezoelectric devices, vibration dependent variable capacitors, and electromagnetic vibration energy harvesting devices. It should be understood that this system is not limited to the use of specific disclosed structures or mechanisms, and the important characteristic of a harvesting device is simply that it is able to convert vibrational energy to electrical energy. Additional information about harvesting devices can be found in the following document: Shen, Donga, "Piezoelectric Energy Harvesting Devices For Low Frequency Vibration Applications," PHd Dissertation, Aubern University, Auburn Ala., May 9, 2009, which is incorporated herein by reference. The term "harvesting device" may refer to a single device, or a cluster or group of such devices.

In step 310, once a type of harvesting device has been chosen, the harvesting device is preferably tuned to the frequency of vibration corresponding to the location to which the device will be attached. This ensures maximal energy harvesting from the device. Tuning may simply involve selection of appropriate geometry or other characteristics for a particular harvesting device. It may also involve alteration of a chosen harvesting device in order to optimize vibrational energy harvesting from the point to which the harvesting device will be attached.

To tune a cantilever beam piezoelectric device to a tuning frequency, geometry of the piezoelectric device can be altered in various ways, until one or more resonant frequencies of the piezoelectric device matches a desired tuning frequency. For a cantilever beam piezoelectric device, tuning can be done by adjusting width, length, thickness, material, or adding a weight to the end of the beam. Cantilever beam piezoelectric devices can also be tuned based on operating temperature.

To tune for operating temperature, temperature of the location of placement of a piezoelectric device at operating conditions is determined. This can be done by directly measuring the temperature during a test flight, or through other methods, including finite element analysis. In one embodiment, once operating temperature is determined, the device should be tuned such that its resonant frequency at the operating temperature matches the frequency of vibration of the structural element to which it will be attached.

In one embodiment, if a particular structural element is known to vibrate at 150 Hz during flight at 0° C., a cantilever beam piezoelectric device may be tuned such that its resonant frequency at 0° C. is 150 Hz.

In step 312, preferably, appropriate harvesting circuitry is coupled to harvesting devices. This circuitry serves to convert the raw electrical signal from the harvesting devices to something more appropriate for powering systems onboard a vehicle.

Referring to FIG. 4, additional methods of identifying paths of significant energy flow to "secondary" structural elements in "secondary" areas are disclosed. In one embodiment, a destination area which is structurally coupled to the primary structural elements, and may therefore receive substantial vibrational energy is identified. Vibrational energy may be transferred primarily either via an airborne path or a structure-borne path. Structure-borne paths of transfer generally transmit much more significant levels of energy than airborne paths of transfer, and thus distinguishing between these two mechanisms is beneficial.

Continuing with FIG. 4, accelerometers can be placed on the primary structures and on secondary structures in the destination area 402 to distinguish between a structure-borne path and an airborne path. In one embodiment, a microphone can be placed somewhere within the intervening space between the primary and secondary structures 404. The primary and secondary structures are then subject to test conditions such as a test flight or test vehicle operation 406. Data from the accelerometers and microphones is gathered and analyzed 408. In one alternative, if it is found that the data from the accelerometers are similar, then the primary and secondary structures are vibrating similarly, and there is a structure-borne transfer of vibrational energy. In yet another alternative, the microphone tracks with the accelerometer on the primary structure, but not the accelerometer on the secondary structure, then vibrational energy transfer is not structure-borne but airborne.

Figure 5:
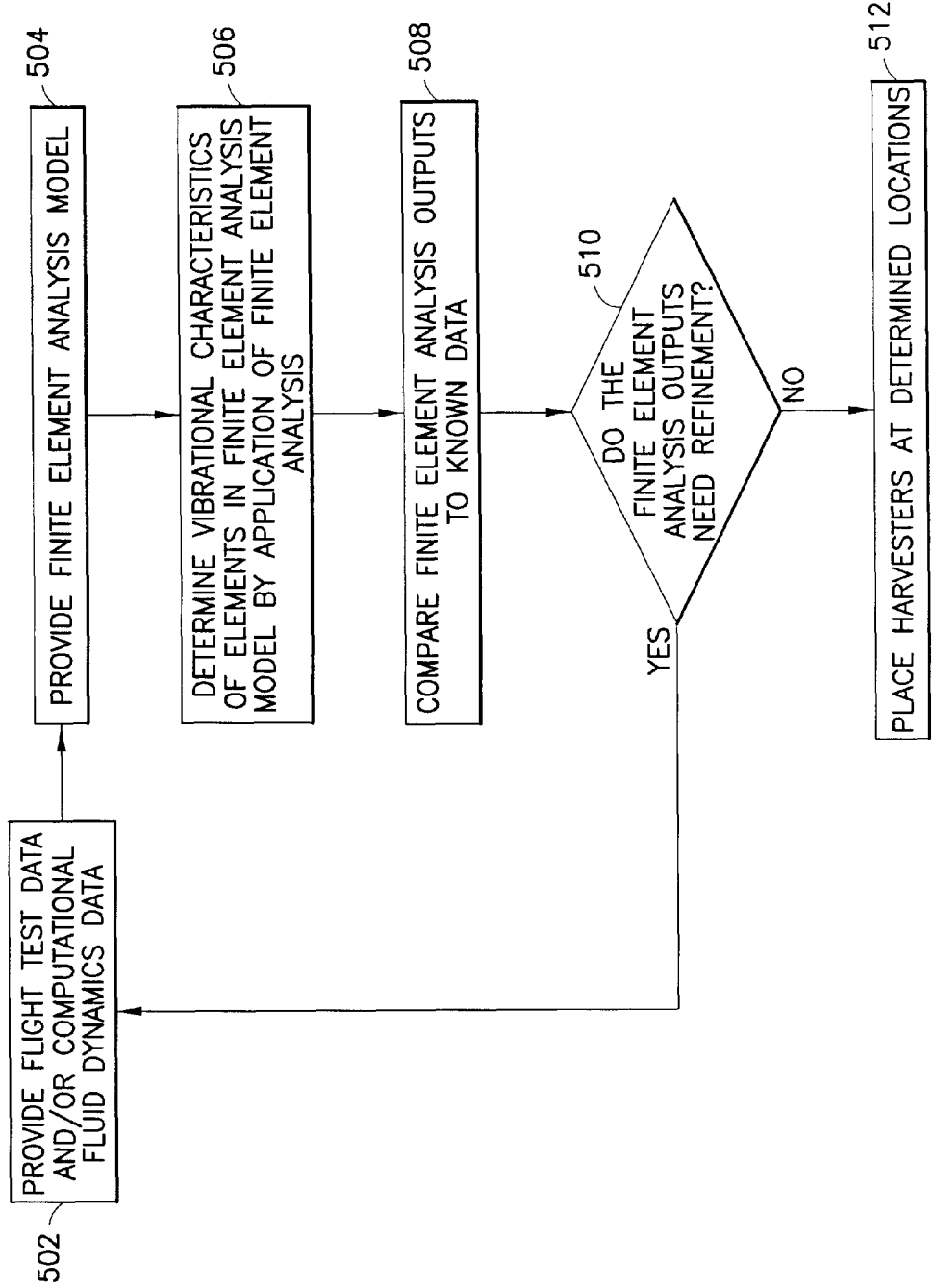
FIG. 5 is an illustration of steps of a method for determining optimal placement of harvesters.

Referring to FIG. 5, a process utilizing FEM analysis for determination of locations for placement of harvesters on structural elements is disclosed. In step 502, test data, data determined from computational fluid dynamics, or other excitation data is provided. In step 504, a model may be built, based on geometry of the structure to be analyzed, and is provided with excitation inputs from step 502. FEM analysis is applied in step 506, and determines vibrational characteristics of the system, as described above. In step 508, results from FEM analysis are compared to known data, such as physical excitation data, and in branch 510, if the results of the FEM analysis are not satisfactory, additional flight test data may be used to help refine the FEM model. Such known data can be any data If results from FEM analysis are found to be satisfactory, harvesters may be placed at the locations determined by this analysis.

Finite element analysis need not be the only way to determine optimal harvester location. Other methods are possible, such as manual probing, during test-flight conditions.

Figure 6:
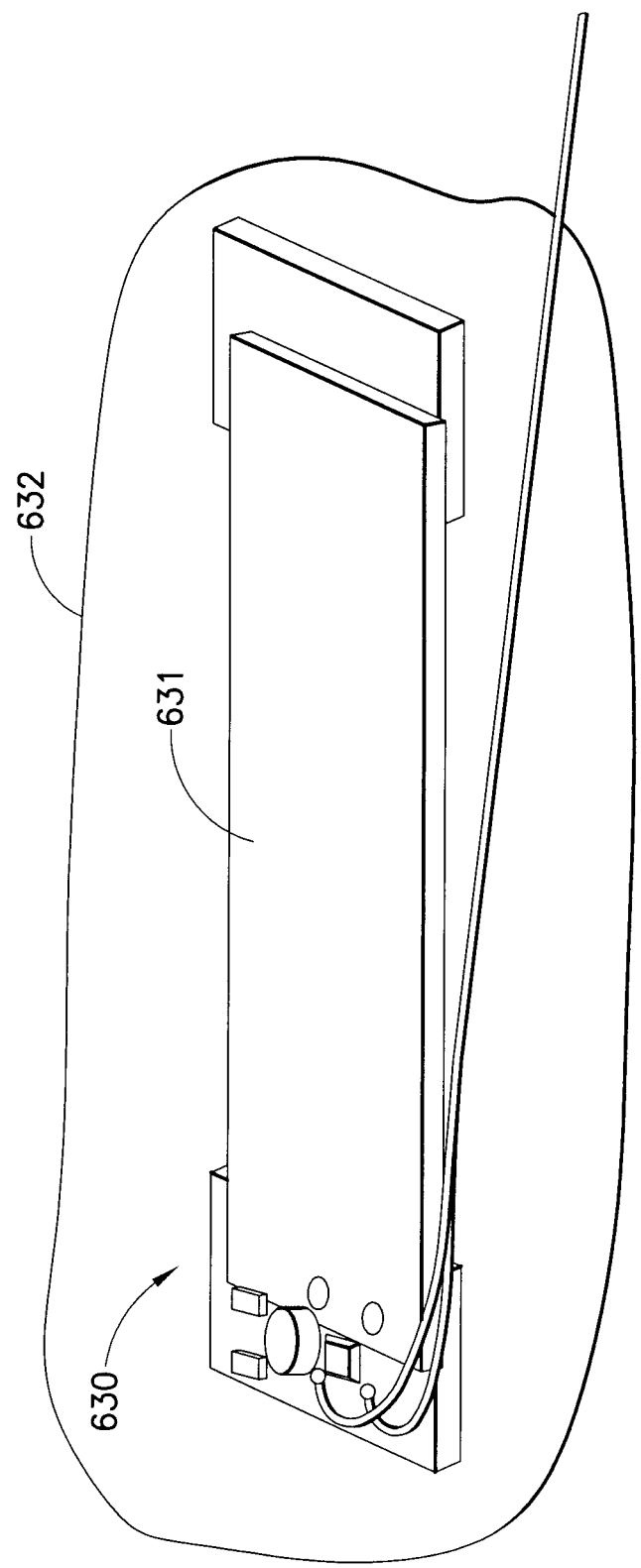
FIG. 6 is an illustration of an example harvester.

Referring to FIG. 6, an example piezoelectric device 630 for harvesting energy from wing-to-body fairing is disclosed. The device is shown attached to surface 632, which, when vibrating, provides mechanical energy to piezoelectric device 630, which converts the mechanical energy to electrical energy for harvesting. Cantilever beam 631 has a resonant vibrating frequency which can be altered by changing the geometry of the beam 631. When subject to vibration, the device 630 produces a high frequency, high voltage electrical signal.

Figure 7:
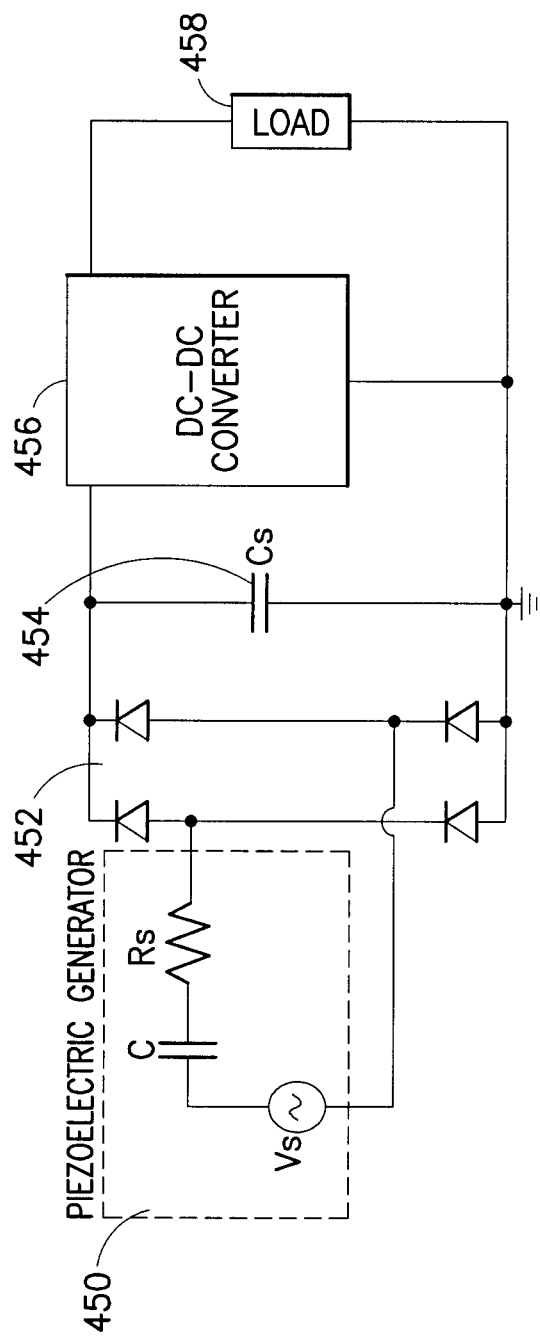
FIG. 7 is an illustration of example harvesting circuitry for use in harvesting energy from vehicles.

Referring to FIG. 7, an example harvesting circuit for a piezoelectric device 30 is disclosed. Piezoelectric generator 450, which may be a cantilever beam piezoelectric device, and is modeled in this figure as a voltage source, capacitor and resistor in series, draws energy from the vibration of the surface to which it is attached, and provides a high frequency AC signal to the harvesting circuit. A rectifier 452 rectifies the AC signal. Capacitor 454 smoothes out the signal from rectifier 452. DC-DC converter 456 converts the high voltage DC signal output from the rectifier 452 and capacitor 454 to a much lower voltage DC signal, which can be used to drive load 458. Load 458 may be a battery or vehicle systems.

To monitor the health of the circuit, a high impedance probe could be provided to determine if there has been a change in either voltage potentials or vibrational frequency characteristics. If such characteristics are different with respect to that of the other piezoelectric devices, this can be a good indicator that the device is no longer in good health.

Once connected to appropriate harvesting circuitry, in step 314, the energy provided by the harvesting system can be used to power various onboard systems or can be used to charge a battery.

The methods provided above allow for optimal selection of location and optimal harvester configuration. It should be understood that utilization of harvesters on any vehicle may be limited by economic cost of the harvesters, complexity of the wiring required, and other practical effects. Optimal selection of location and configuration permits additional energy to be harvested at reduced cost. A balance may therefore be struck between amount of energy harvested, which is determined by number of harvesters utilized, versus economic cost and complexity of the overall design.

An example of the above-described systems and methods will now be provided. This specific example utilizes cantilever beam piezoelectric devices to harvest vibrational energy from wing-to-body fairing panels of an aircraft. Specific characteristics of the wing-to-body fairing panels will be described, as well as placement locations and techniques for placement of the harvesting devices. It should be noted that the example provided is only meant to illustrate the methods and systems described above and should not be taken to be limiting. Modifications in accordance with the disclosure are contemplated, such as alteration of the type and configuration of energy harvesting device, alteration of placement locations based on various vibrational characteristics, and other alterations. Additionally, the methods described above can be used to identify other structures of an aircraft which possess significant vibrational energy, such as areas on the aircraft impinged upon by shock cell noise, or other areas that experience turbulent airflow.

Figure 8:
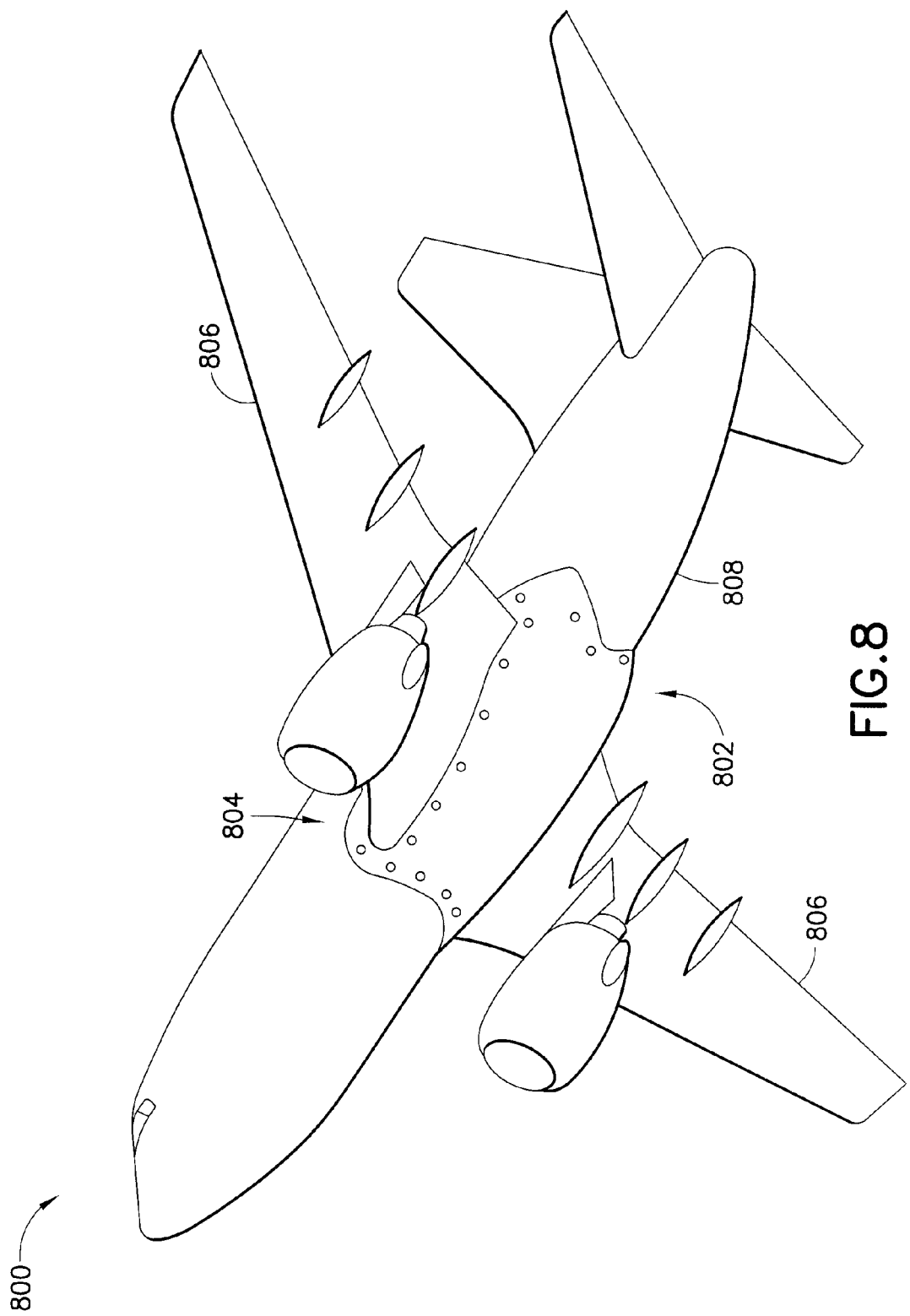
FIG. 8 is an illustration of an example aircraft suitable for harvesting energy, showing wing-to-body fairing panels.

Referring now to FIG. 8, an aircraft 800 having wing-to-body fairing area 802 covering the joint area 804 between wings 806 and fuselage 808 of the aircraft is shown. Although not shown in this figure, wing-to-body fairing area 802 is divided into various wing-to-body fairing panels, which are attached to the fuselage by a frame structure (not shown). Wing-to-body fairing panels smooth airflow in a region which would otherwise have abrupt surface transitions, for example, between wings 806 and fuselage 808, which would lead to increased drag.

Referring now to FIGS. 9 and 10A-10E, exemplary wing-to-body fairing panels A01 through A05, which might be used on commercial passenger aircraft. Graphs showing test flight data collected from panels A01 through A05 are provided in FIGS. 10A-10E, respectively. The graphs plot vibrational acceleration in G's vs. test flight time. "G" denotes multiples of acceleration of the Earth's gravity. Generally speaking, throughout these figures it can be seen that all panels exhibit a constant, substantially high amount of vibration.

Figure 9:
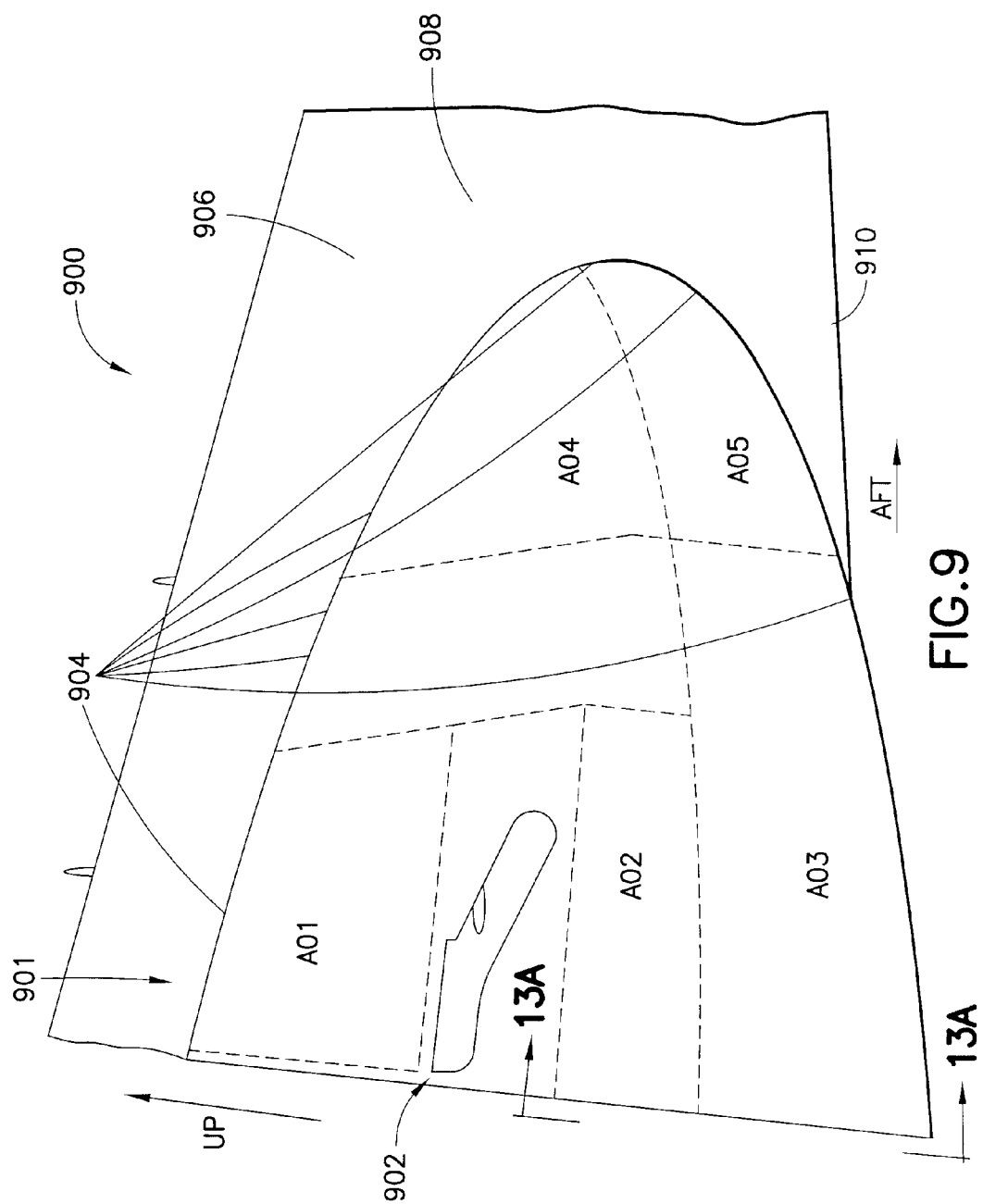

The illustration shown in FIG. 9 depicts a portion of an aircraft at which wing-to-body fairing panels 901 (also referred to as "WTBF" or "WTBF panels") are installed. FIG. 9 is limited to those panels which are aft of the wing. It should be understood, however, that energy harvested by the methods disclosed can be done at any wing-to-body fairing panel. Panels A01 through A05 are shown in this figure. This figure is a left-bottom side perspective view of the aircraft 900, showing left side 908 and bottom side 910 of the aircraft 900. Wing-to-body fairing panels are collectively referred to with number 901.

Panel A01 is located directly above wing 902. Panel A02 is located directly below wing 902. Panel A03 is located adjacent panel A02, but further towards the bottom side 910 of the aircraft 900. Panel A04 is located at approximately the same height as panels A01 and A02, and is adjacent those panels, but is further towards the rear of the aircraft 900, in comparison to those sections. Finally, panel A05 is located adjacent panel A04, and further towards the bottom side 910 of the aircraft 900. FIG. 9 also shows points of direct attachment 904 between the wing-to-body fairing panels (A01-A05) and the aircraft skin 906.

The plots in FIGS. 10A-10E graphs of vibrational acceleration vs. time for five different panels as shown in FIGS. 10A-10E and FIG. 9. All plots depict data for two separate test flights. The minimum point 1002 in each of the plots separates the data from flight one 1004 from the data from flight two 1006.

Figure 10A:
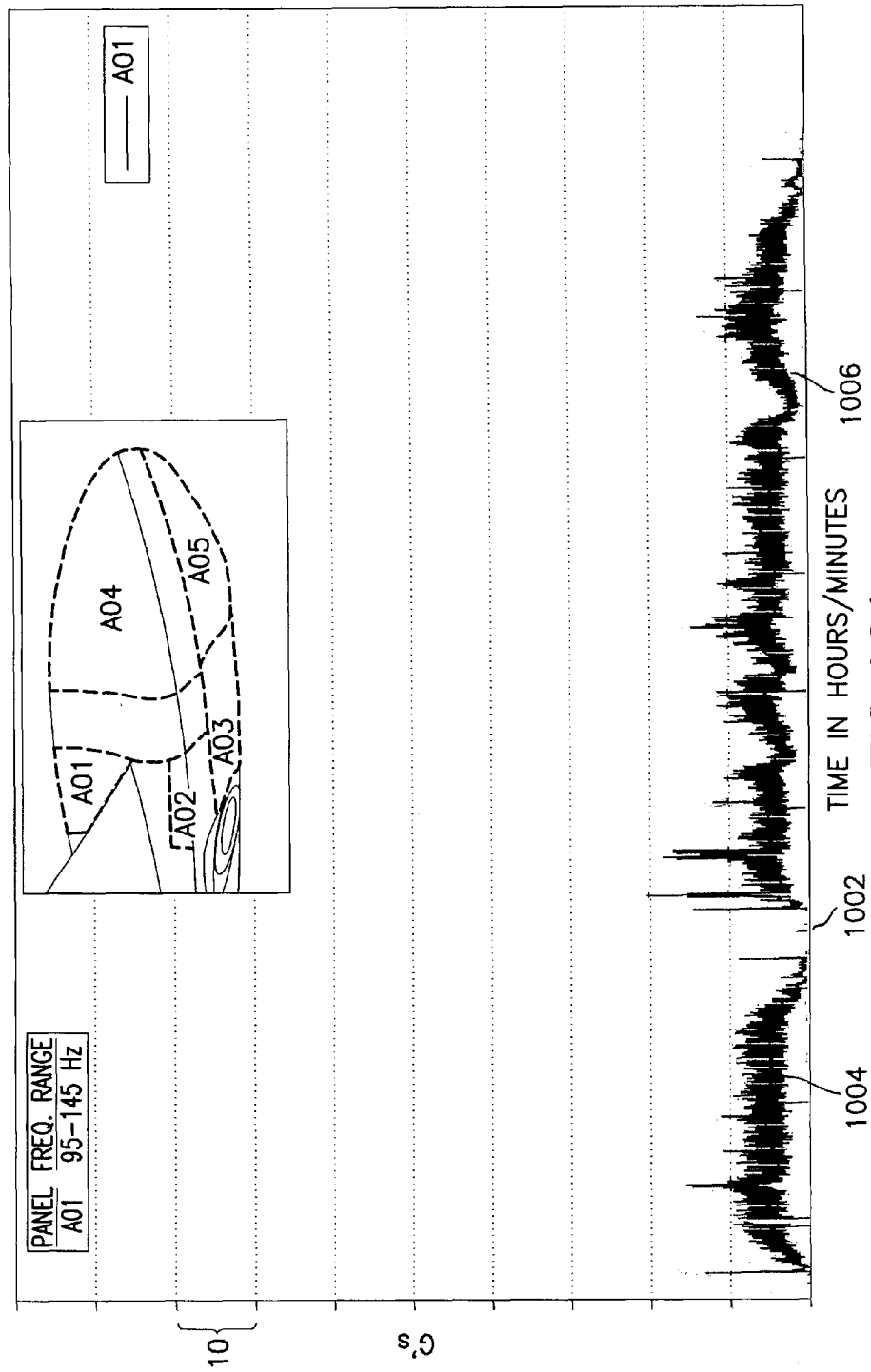

FIG. 10A depicts the plot described above for section A01. During most flight phases, including cruising at different altitudes, vibration of the A01 section is measured at approximately 7 G's. The panels vibrate at roughly 95-145 Hz.

Figure 10B:
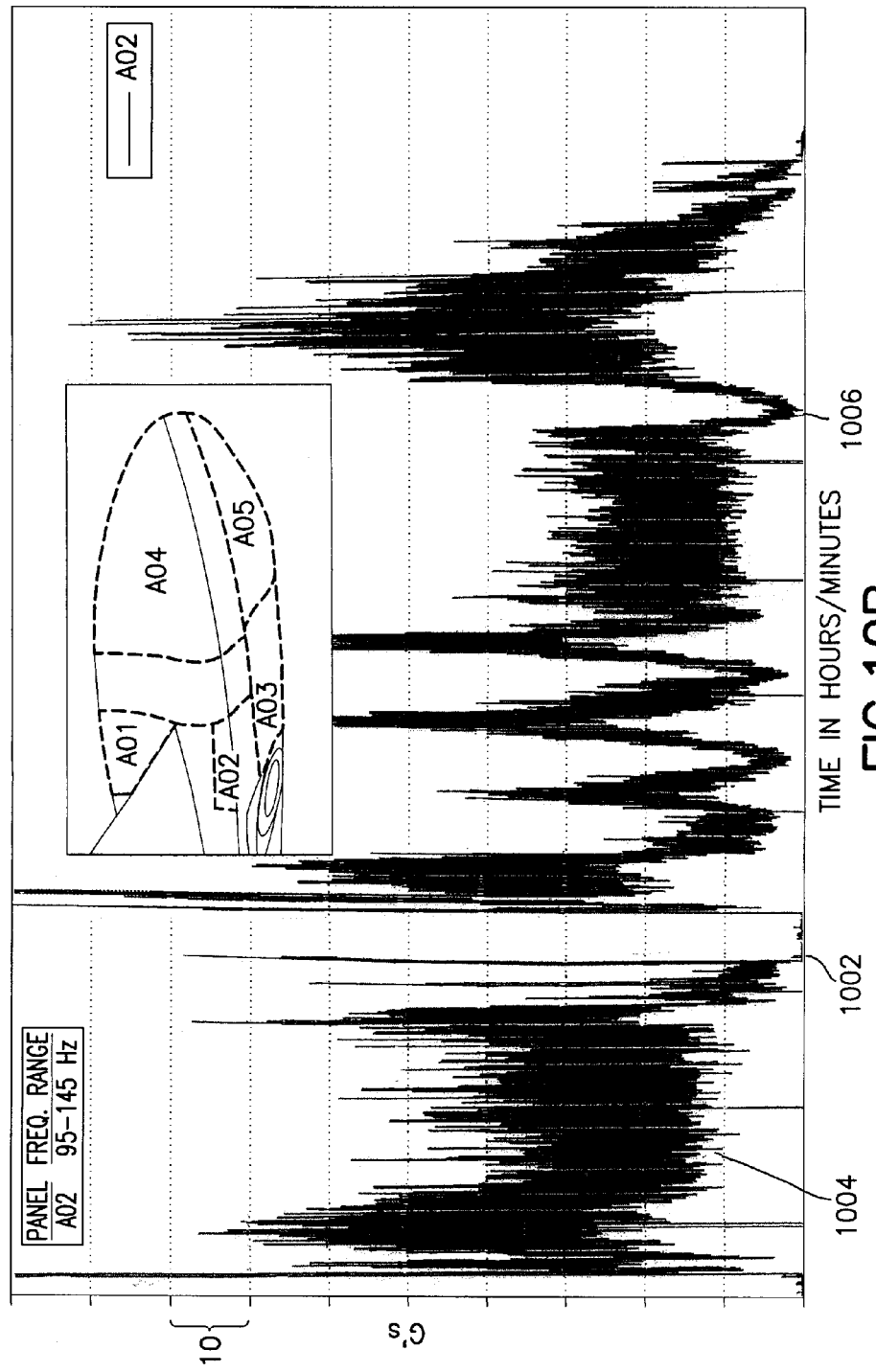

FIG. 10B depicts the plot described above for section A02. During most flight phases, including cruising at different altitudes, vibration of the A02 section is measured at between approximately 20 G's and 50 G's. This panel vibrates the most but also has the highest variation in vibrational acceleration. The panels vibrate at roughly 95-145 Hz.

Figure 10C:
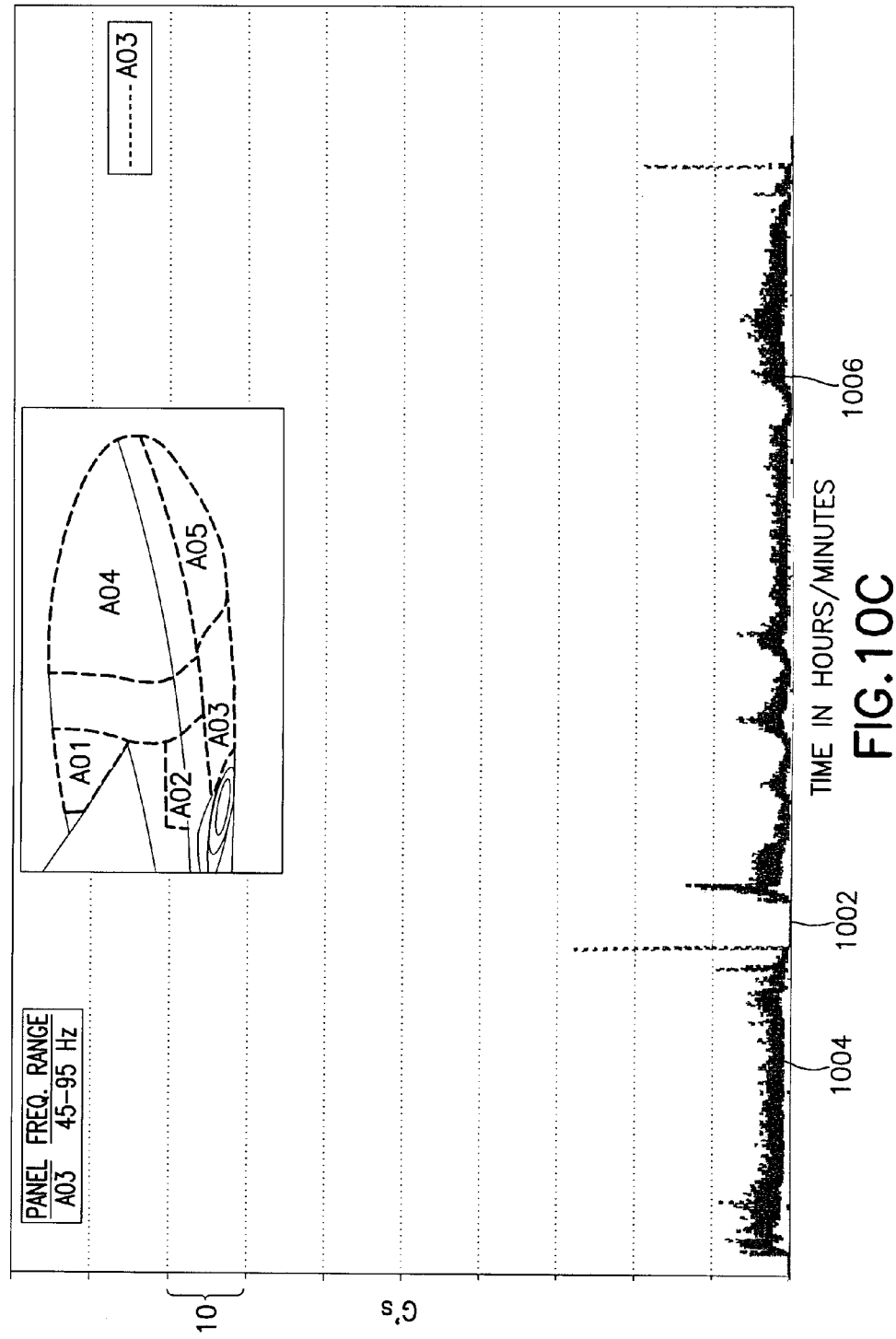

FIG. 10C depicts the plot described above for section A03. During most flight phases, including cruising at different altitudes, vibration of the A03 section is measured at approximately 1-2 G's. The panels vibrate at roughly 45-95 Hz.

Figure 10D:
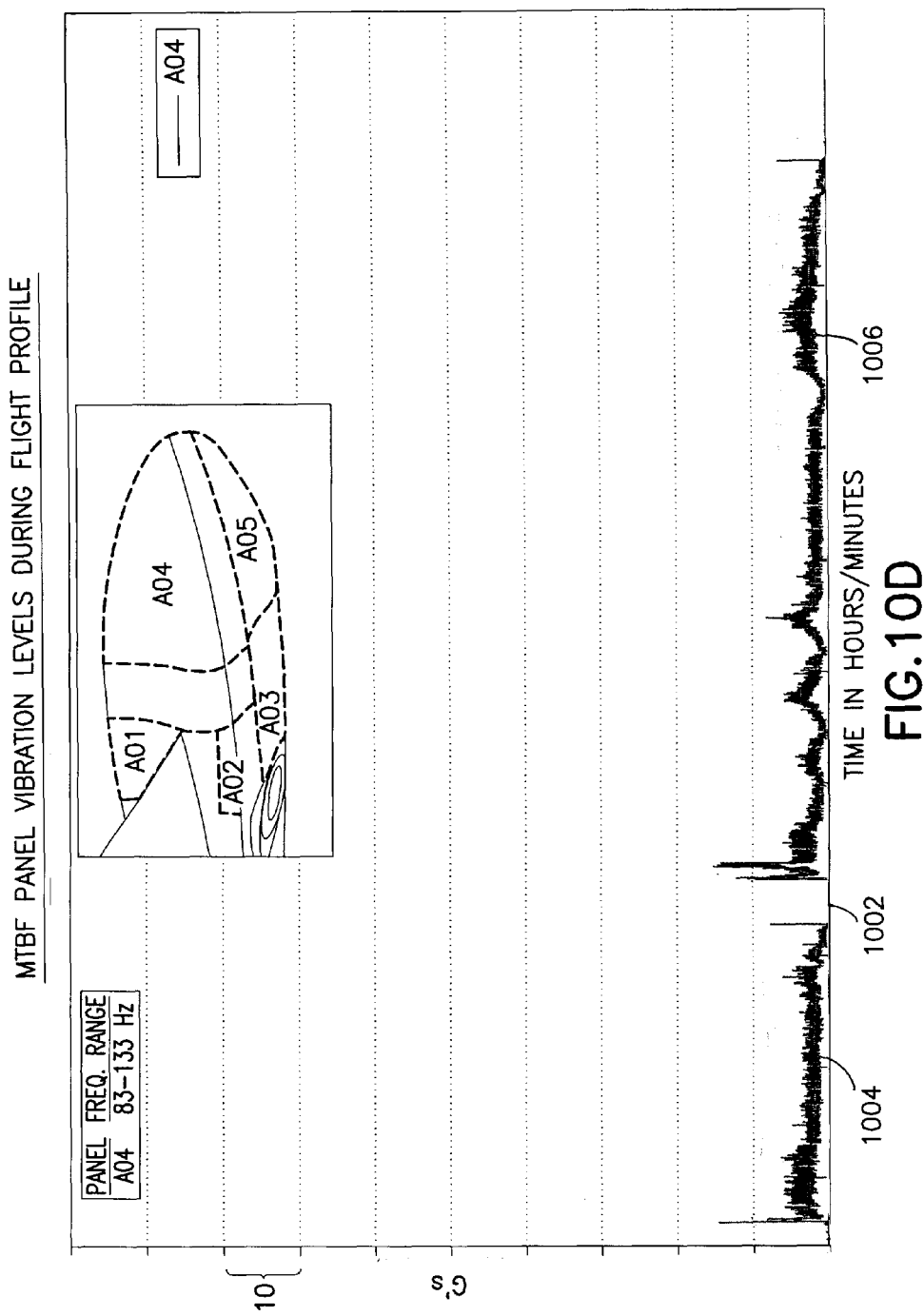

FIG. 10D depicts the plot described above for section A04. During most flight phases, including cruising at different altitudes, vibration of the A04 section is measured at approximately 3 G's. The panels vibrate at roughly 83-133 Hz.

FIG. 10E depicts the plot described above for section A05. During most flight phases, including cruising at different altitudes, vibration of the A05 section is measured at approximately 10 G's. The panels vibrate at roughly 65-115 Hz.

Additional structures coupled to the WTBF panels may receive significant vibrational energy from the WTBF panels. To determine locations of significant energy flow, structure-borne paths of vibrational energy transfer are identified.

Figure 11:
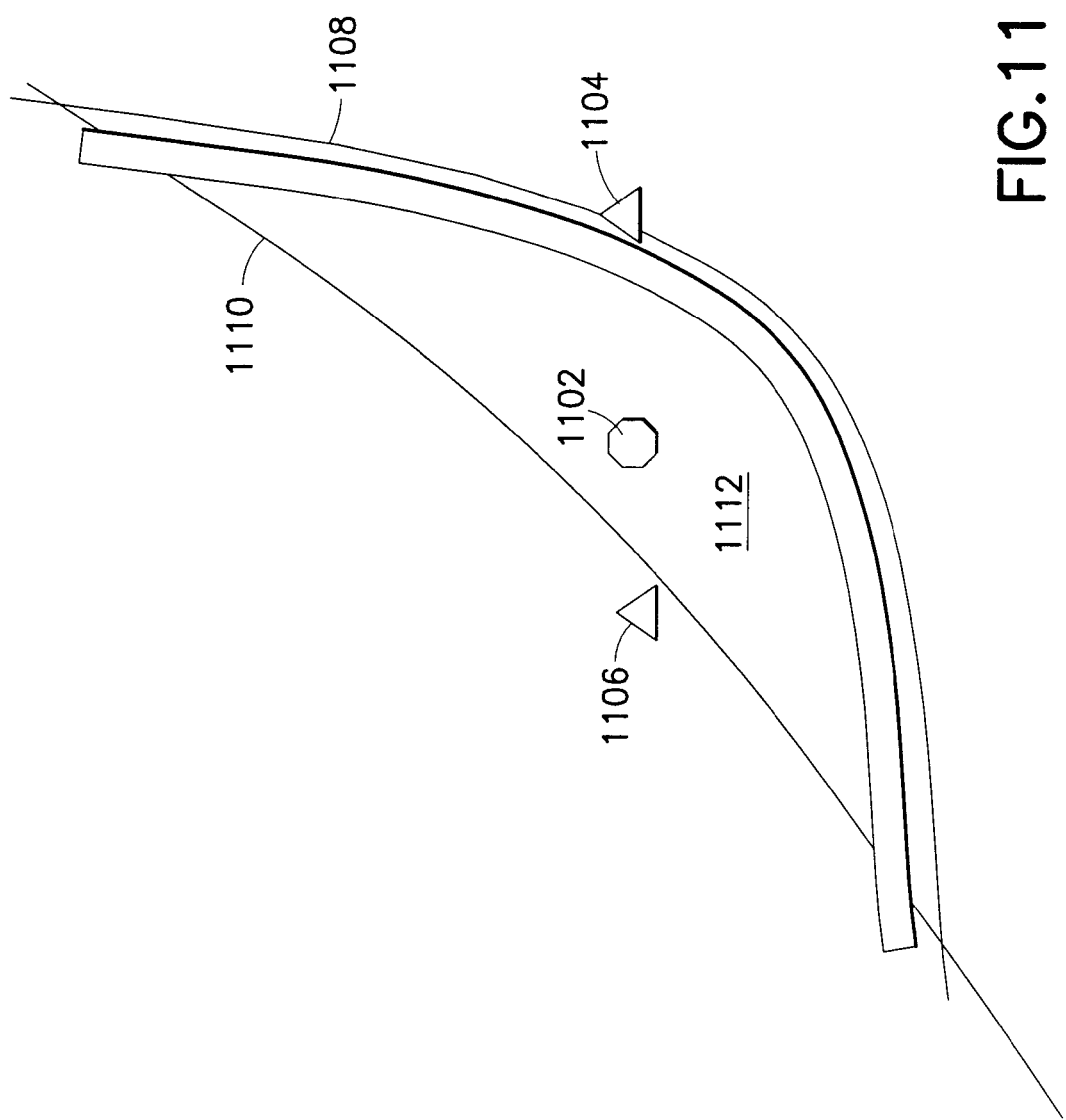
FIG. 11 is a schematic illustration of a method for determining "secondary" structures from which to harvest energy, as applied to wing-to-body fairing panels.

FIG. 11 depicts application of the method described with respect to FIG. 4 to the area near wing-to-body fairing panels. FIG. 4 depicts a method of locating "secondary" sources of vibrational energy, once a "primary" source has been found. In the example described, the wing-to-body fairing panels are considered "primary" sources, and "secondary" sources—in this case, structures physically coupled to the wing-to-body fairing panels—are analyzed to determine whether they possess significant vibrational energy that can be harvested. The analysis described with respect to FIG. 11 utilizes microphones and accelerometers to determine whether energy is flowing from "primary" sources through a structure-borne path. If a structure-borne path exists, then energy can be harvested at least at the location to which the structure-borne path of energy transfer leads.

FIG. 11 is a cross-section showing WTBF panel 1108, aircraft skin 1110, and a cavity 1112 in between WTBF panel 1108 and aircraft skin 1110. The methods of FIG. 4 will be applied to the structures presented in this illustration in order to determine whether additional energy can be harvested at "secondary" structures. For the example depicted, "secondary" structures would include any structure physically coupled to the wing-to-body fairing panels. Here, such structures would include the wing-to-body fairing support frame, points on the aircraft skin touching the wing-to-body fairing support frame, and stringers and frames within the aircraft, located in the vicinity of the wing-to-body support panels.

To make a determination of whether a structure-borne path of energy transfer away from the WTBF panels exists, microphones 1102 may be placed within the cavity 1112 between WTBF panel 1108 and aircraft skin 1110. Accelerometers 1104, 1106 may be placed on the WTBF panels 1108, and the airplane's skin 1110.

This area is then subjected to real flight conditions, or test conditions in order to produce readings from the accelerometers 1104, 1106 and the microphone 1102. These readings are recorded. If the readings from accelerometers 1104 on the wing-to-body fairing panels 1108 are not similar to the readings from the accelerometers 1106 on the aircraft skin 1110, no structure-borne path of energy transfer is likely to exist. However, if readings from accelerometers 1104 and 1106 are similar, and readings from the microphone 1102 are different from the accelerometer readings, a structure-borne path of energy transfer is likely to exist. Generally speaking, readings from two different instruments can be said to be "similar" if they show similar increases and decreases at similar times.

In one test, it was found that the accelerometers tracked each other, and therefore that a structure-borne path of energy is likely to exist. This means that energy can likely be harvested downstream from the WTBF panels, at the stringers and frames internal to the aircraft which are coupled to the WTBF panels directly or indirectly, or at other points on the aircraft structurally coupled to the WTBF panels. Consequently, energy can be harvested at any of the following locations in the vicinity of the WTBF panels:

1) On the wing-to-body fairing support structure 1202 for the wing-to-body fairing panels 901.

Figure 12:
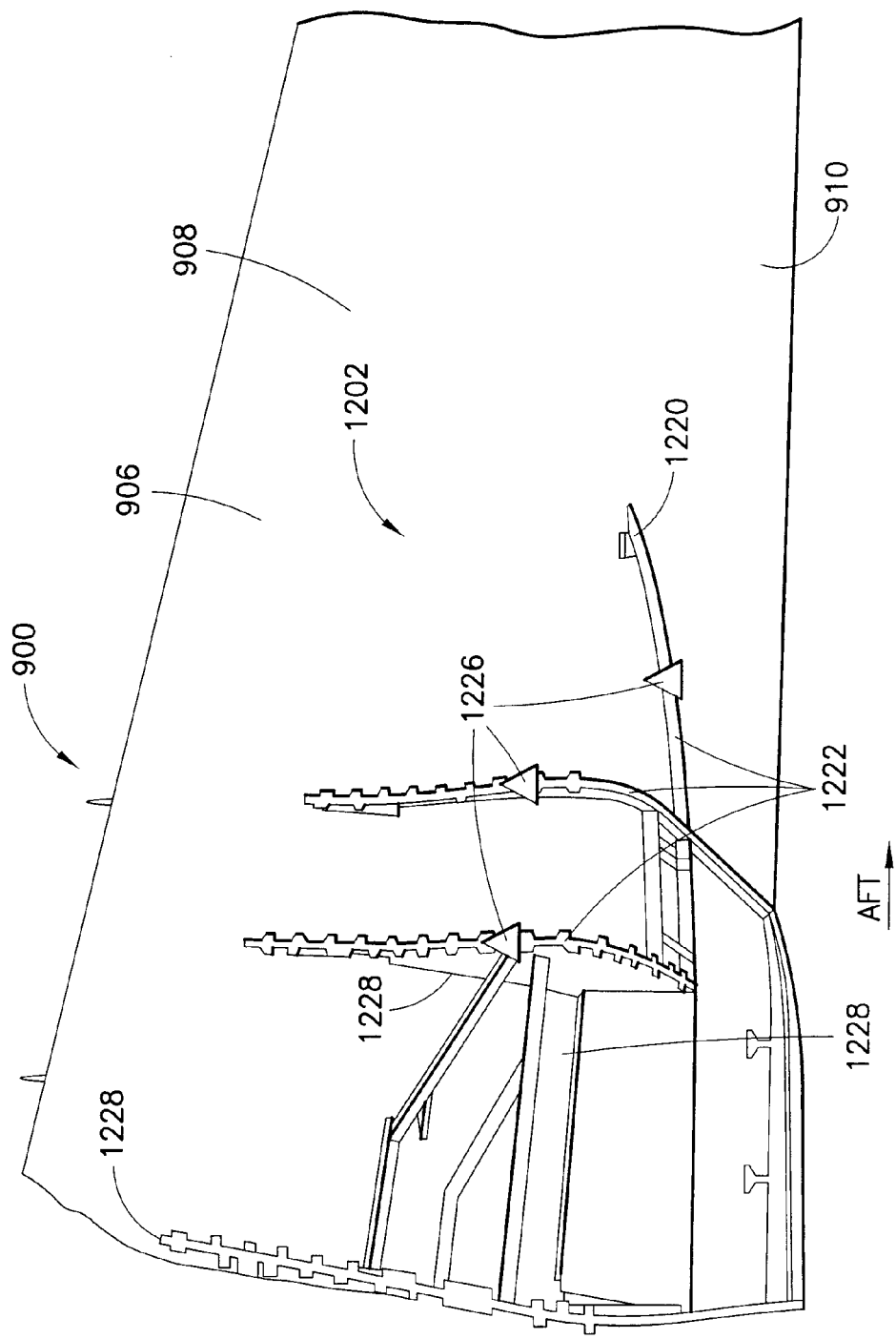
FIG. 12 is an illustration of a wing-to-body fairing support from in the region depicted in FIG. 9.

2) At the attachment points 1228 between the wing-to-body fairing support structure 1202 and the fuselage (shown in FIG. 12).

3) At the points of direct attachment 904 between the WTBF panels 901 and the fuselage 906.

Figure 13A:
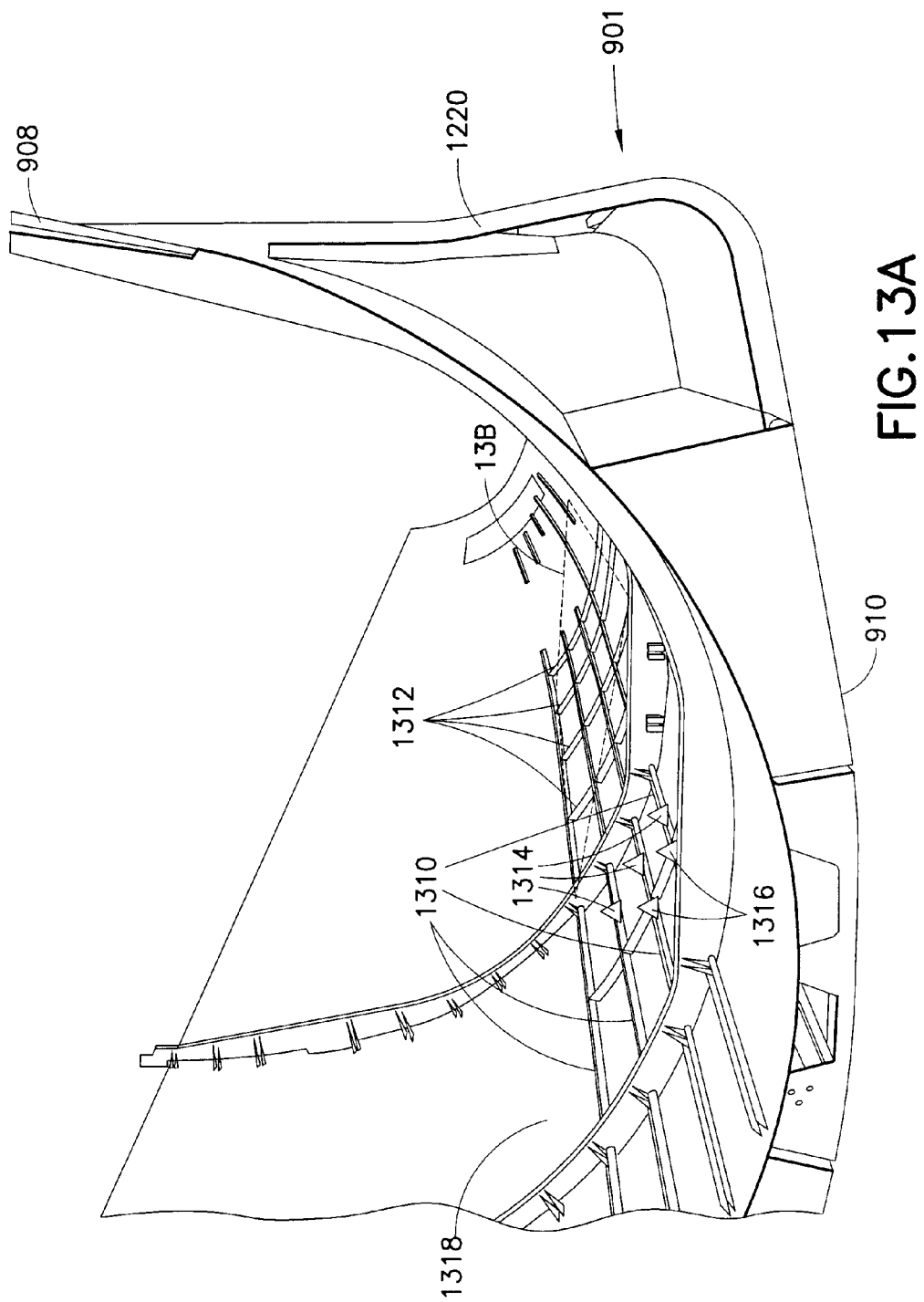
FIG. 13A is an illustration of the interior of an aircraft, in the region of the wing-to-body fairing panels, showing stringers and frames suitable for vibrational energy harvesting.
Figure 13B:
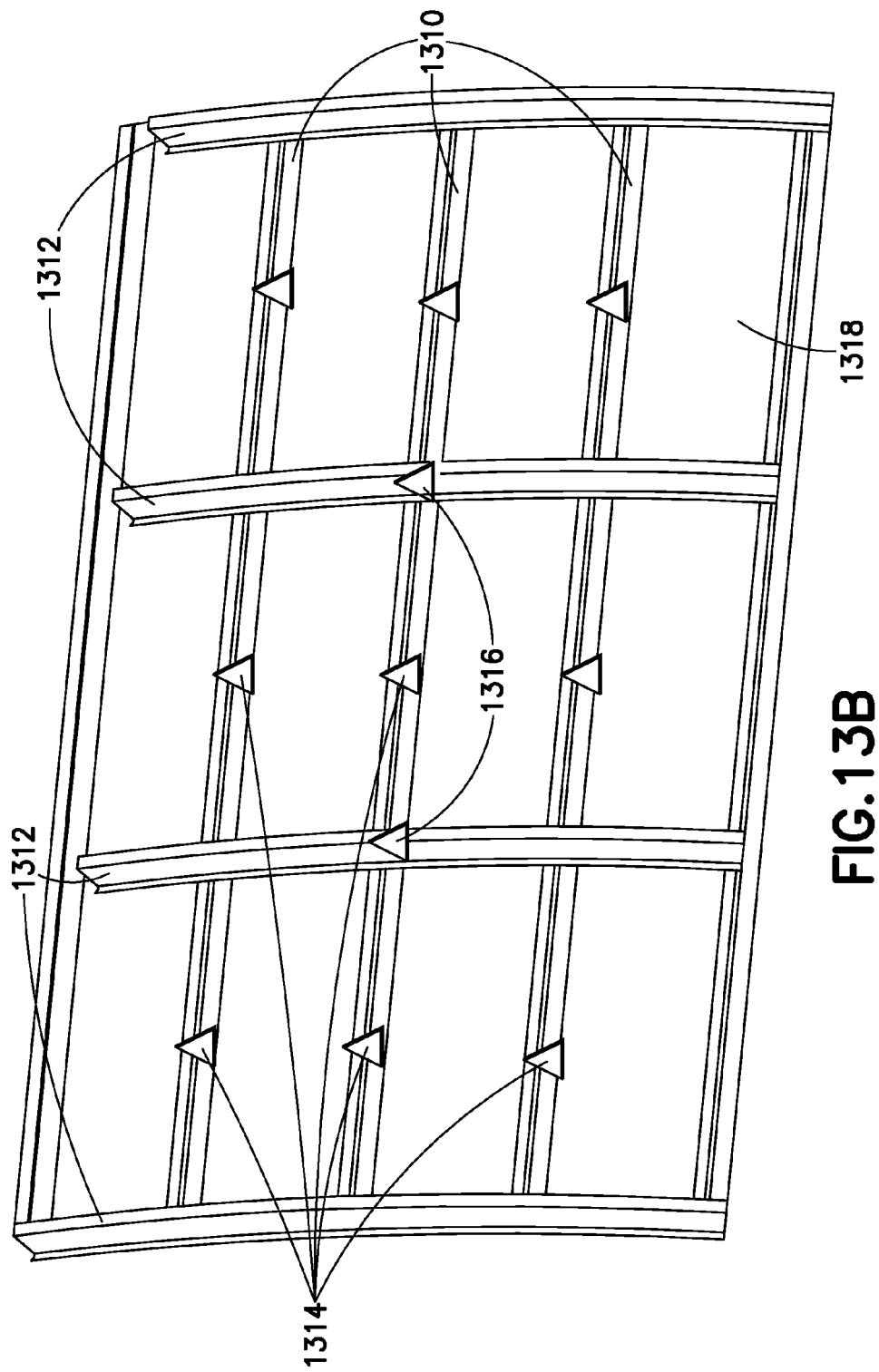
FIG. 13B is an illustration of several stringers and frames shown in FIG. 13A.

4) On the stringers 1310 and frames 1312 that are being excited and are directly downstream of the vibrational energy generated at the wing to body fairing panels 901 (seen in FIGS. 13A-13B).

These areas will be discussed below, with respect to FIGS. 12-14.

Using methods described above, with respect to FIG. 5, optimal placement locations for harvesters may be determined. These methods can include utilizing finite element analysis methodology, manual measurements, or other methodology to locate areas of maximal vibrational displacement. Once optimal placement of piezoelectric devices has been determined, piezoelectric devices may be tuned to match the frequency of vibration of each of these panels. The piezoelectric devices may then be attached to the determined locations.

Referring to FIG. 12, wing-to-body fairing support structure area 1202 of the aircraft is shown, with wing-to-body fairing panels (not shown) removed. FIG. 12 depicts the aircraft 900 shown in FIG. 9 in a left-bottom perspective view, showing left side 908 and bottom side 910 of the aircraft 900.

Directly beneath and supporting the WTBF panels is a wing-to-body fairing support structure 1220, consisting of various frame elements 1222 coupled to each other and to stringers and frame elements within the fuselage (not shown in this illustration). The wing-to-body fairing support structure 1220 provides attachment points for the wing-to-body fairing support panels, and supports those panels in a position that is displaced from the surface of the fuselage. Wing-to-body fairing panels are attached directly to this wing-to-body fairing support structure 1220. The support structure 1220 may be attached to the aircraft skin 1224 by the same rivets and bolts used to attach the stringers and frames to the skin. Usage of the same rivets in this manner is believed to contribute to structure-borne energy transfer from the wing-to-body fairing panels to the frames and stringers on the inside of the aircraft in the 737-NG, and may do so in other aircraft.

Several example locations of placement for harvester devices 1226 on the support structure 1220 are shown in FIG. 12. It should be understood that the locations shown are exemplary, and that proper application of methods described above with respect to FIG. 5 can be used to determine appropriate sites for placement of the harvester devices 1226. Locations for optimal energy harvesting are the locations at which the frame elements of the WTBF support structure have maximal vibrational displacement. This should correspond to the maximal displacement location of the first bending mode of each frame.

Referring to FIGS. 13A and 13B, an example interior of an aircraft is shown, at a location near wing-to-body fairing panels 901. FIG. 13A is a perspective illustration looking towards the rear of an airplane 900 taken from lines 13A-13A in FIG. 9. FIG. 13B is a top-down view of the dotted area shown in FIG. 13A.

Stringers and frames are located adjacent to aircraft skin and on the inside of the aircraft, and are provided to give form to the aircraft. The stringers and frames adjacent the area near the wing-to-body fairing panels may include energy harvesters to harvest energy which is flowing from a structure-borne path away from the wing-to-body fairing panels.

Energy can be harvested from stringers 1310 and frame elements 1312, at the interior of the fuselage 1318 by placing harvester devices at these locations. Example placement of harvesters on the stringers 1310, is shown as roughly halfway between two different frames elements 1312. Example placement of harvesters on frame elements 1312 is shown roughly at the area of intersection between frame elements 1312 and stringers 1310. Again, however, it should be noted that proper application of the methods described above, notable those described with respect to FIG. 5 may be used to determine optimal harvester placement, which corresponds to the location of maximal displacement of each stringer and frame element. Again, these locations are likely to correspond to the maximal displacement location of the first bending mode or possibly the first twisting mode of each stringer and frame element.

Figure 14:
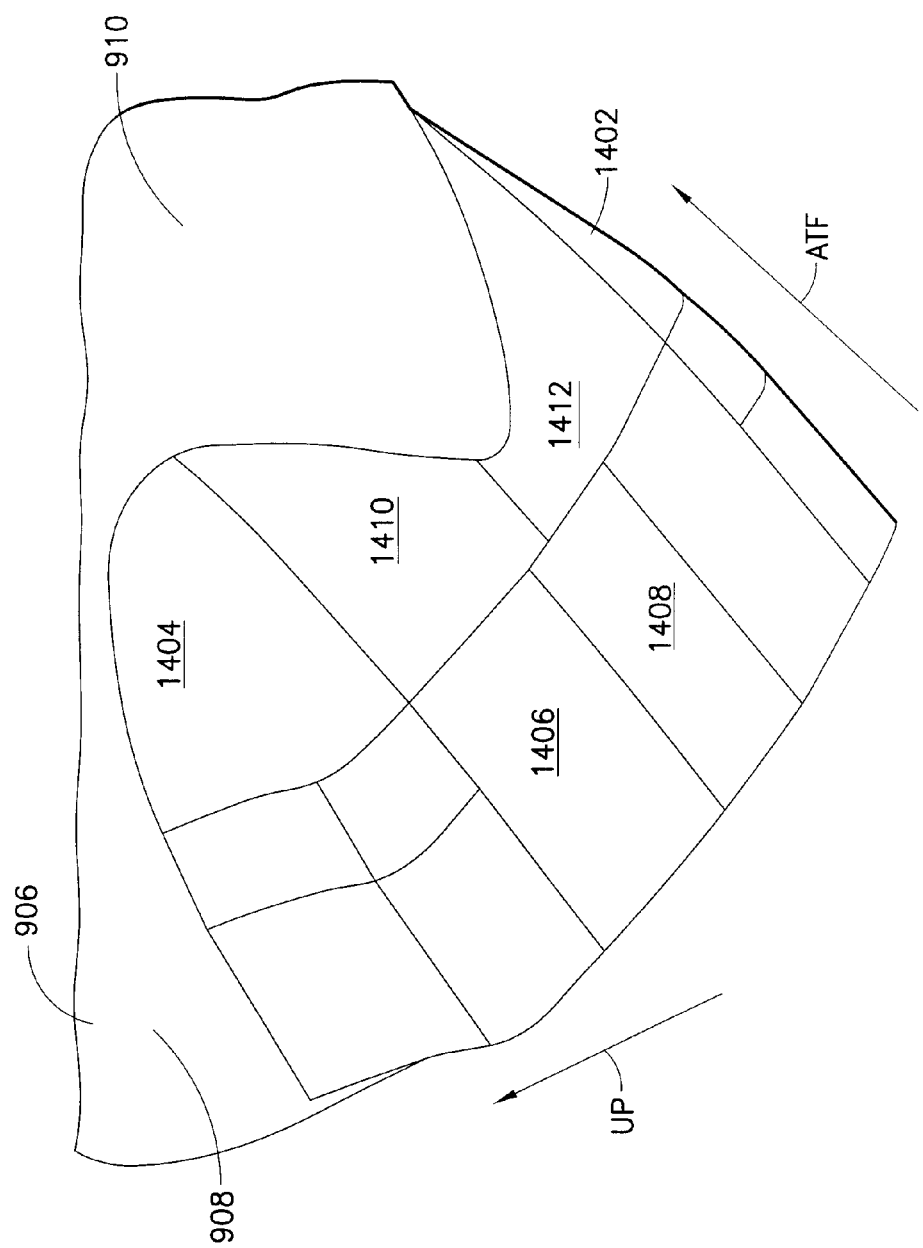
FIG. 14 is an illustration of several wing-to-body fairing panels suitable for harvesting energy, in the region of the aircraft depicted in FIG. 9.

Referring to FIG. 14, the area of the aircraft 900 shown in FIG. 9 is depicted in a bottom-left side perspective view. Bottom side 910 and left side 908 of the aircraft are shown. Wing-to-body fairing panels 1402, 1404, 1406, 1408, 1410 and 1412, shown on the bottom and sides of the aircraft, determined to possess high amounts of vibrational energy during flight, are shown. Harvesters would be positioned at appropriate locations using the above-described methods. Specifically, harvesters would be located at the points of maximal displacement on these panels in order to capture maximal energy. The above-described methods disclosed with respect to FIG. 5 can be used to make these determinations.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention.

We claim:

1. An apparatus for harvesting vibrational energy from structural elements of a vehicle possessing vibrational energy, said apparatus comprising:
   a first vibrational energy harvester coupled to a wing-to-body fairing panel in a primary area of the vehicle, and tuned to a frequency of vibration of the wing-to-body fairing panel in the primary area, and a second vibrational energy harvester coupled to a second structural element in a secondary area of the vehicle, the secondary area structurally coupled to and receiving vibrational energy from the primary area, the second structural element comprising a wing-to-body fairing support frame.

2. The apparatus of claim 1, wherein:
   the first vibrational energy harvester is coupled to a substantially maximal vibrational displacement node of the wing-to-body fairing panel.

3. The apparatus of claim 2, wherein:
   the first vibrational energy harvester is a piezoelectric device.

4. The apparatus of claim 3, wherein:
   the second vibrational energy harvester is a piezoelectric device.

5. The apparatus of claim 4, further comprising:
   additional piezoelectric devices placed on stringers and frames located near the area of said wing-to-body fairing panel.

6. The apparatus of claim 4, further comprising:
additional piezoelectric located at points of direct attachment between said wing-to-body fairing panel and said aircraft skin.

7. The apparatus of claim 4, further comprising:
additional piezoelectric located at points of direct attachment between said wing-to-body fairing support frame and said aircraft skin.

8. The apparatus of claim 4, further comprising:
a high impedance probe for monitoring the health of said piezoelectric devices by checking for changes in voltage or vibrational frequency characteristics.

9. An apparatus for harvesting vibrational energy from structural elements of a vehicle possessing vibrational energy, said apparatus comprising:
a vibrational energy harvester coupled to a substantially maximal vibrational displacement node of the structural element, and tuned to a frequency of vibration of the maximal virbrational displacement node;
said vibrational energy harvester is located within a primary area having structural elements with vibrational energy; wherein the vibrational energy is induced in said structural elements due to turbulent airflow caused by shape or positioning of vehicle features or airflow generated by an engine, said airflow impinging on a surface of the vehicle;
said vehicle has a secondary area structurally coupled to, and receiving vibrational energy from said primary area; and
said secondary area has a vibrational energy harvester coupled to a structural element possessing significant vibrational energy within said secondary area.

10. The apparatus of claim 9, wherein:
the vibrational energy harvester is selected from the group consisting of a piezoelectric device, an electrostatic energy harvester and an electromagnetic energy harvester.

11. The apparatus of claim 10, wherein:
the vibrational energy harvester includes a cantilever beam piezoelectric device.

12. The apparatus of claim 9, further comprising:
harvesting circuitry coupled to the vibrational energy harvester, wherein said harvesting circuitry converts a raw electrical output of the harvester to a form more appropriate for use with onboard electrical systems.

13. The apparatus of claim 9, wherein:
the vibrational energy harvester comprises a cluster of individual energy harvesting devices.

14. The apparatus of claim 9, wherein the maximal displacement node is located on a structural element within a primary area.

* * * * *